United States Patent
Prola

[15] 3,672,071
[45] June 27, 1972

[54] GAME DEVICE

[72] Inventor: Victor J. Prola, 334 Maple Avenue, Blairsville, Pa. 15717

[22] Filed: Feb. 24, 1970

[21] Appl. No.: 13,486

[52] U.S. Cl. .................................................................35/9 B
[51] Int. Cl. .........................................................G09b 7/00
[58] Field of Search ...................................35/8 R, 9 R, 22 R

[56] References Cited

UNITED STATES PATENTS

| | | | |
|---|---|---|---|
| 1,673,659 | 6/1928 | Anderson | 35/9 R |
| 3,266,172 | 8/1966 | Heinberg | 35/8 R |
| 3,171,114 | 2/1965 | Butler et al. | 35/8 R |
| 3,103,750 | 9/1963 | Werner | 35/9 R |

*Primary Examiner*—Wm. H. Grieb
*Attorney*—Melvin A. Crosby

[57] ABSTRACT

A device in which a series of instructions, such as instructions for mathematical operations are supplied in the form of visible or audible signals, and in sequence. At the end of the sequence of instructions, an answer signal is supplied so that the operator of the device can check the accuracy with which the signalled instructions have been followed. For visible signals, the instructions and answers are printed and are made sequentially visible by the sequential energization of respective lamps.

For audible signals, the instructions and answer are voice recordings and are supplied sequentially by way of a transcribing device.

14 Claims, 10 Drawing Figures

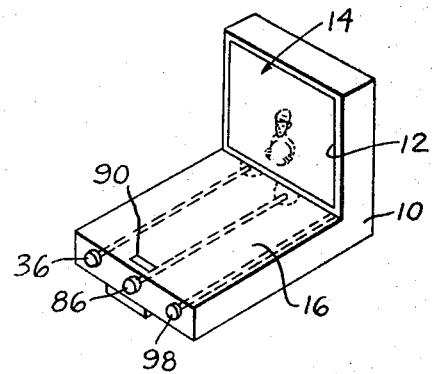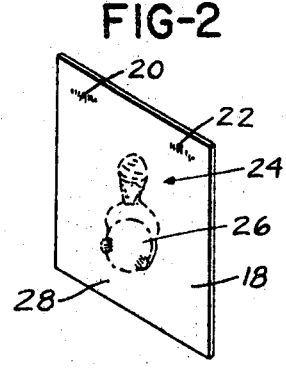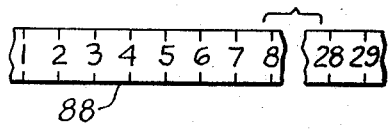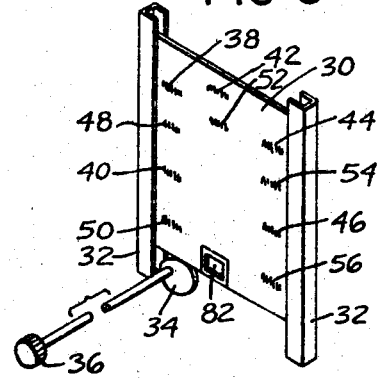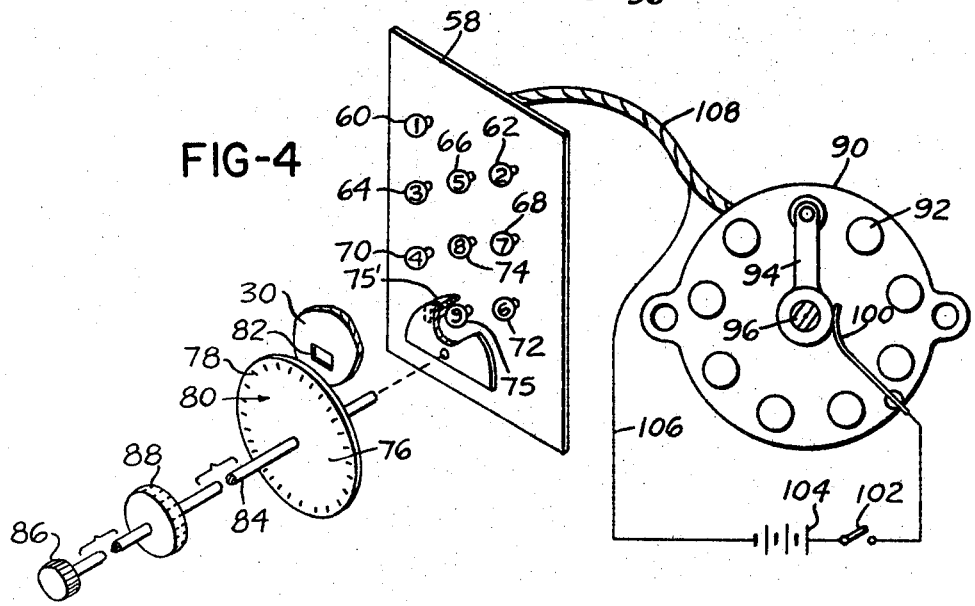

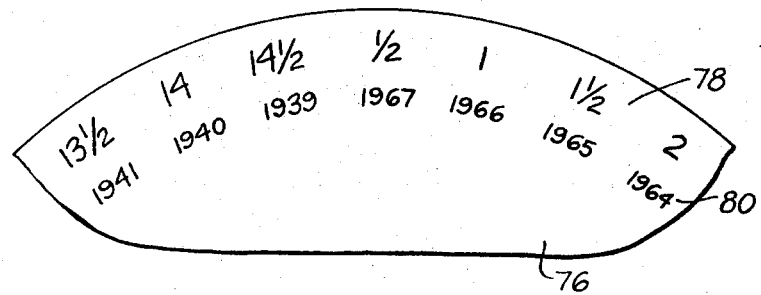
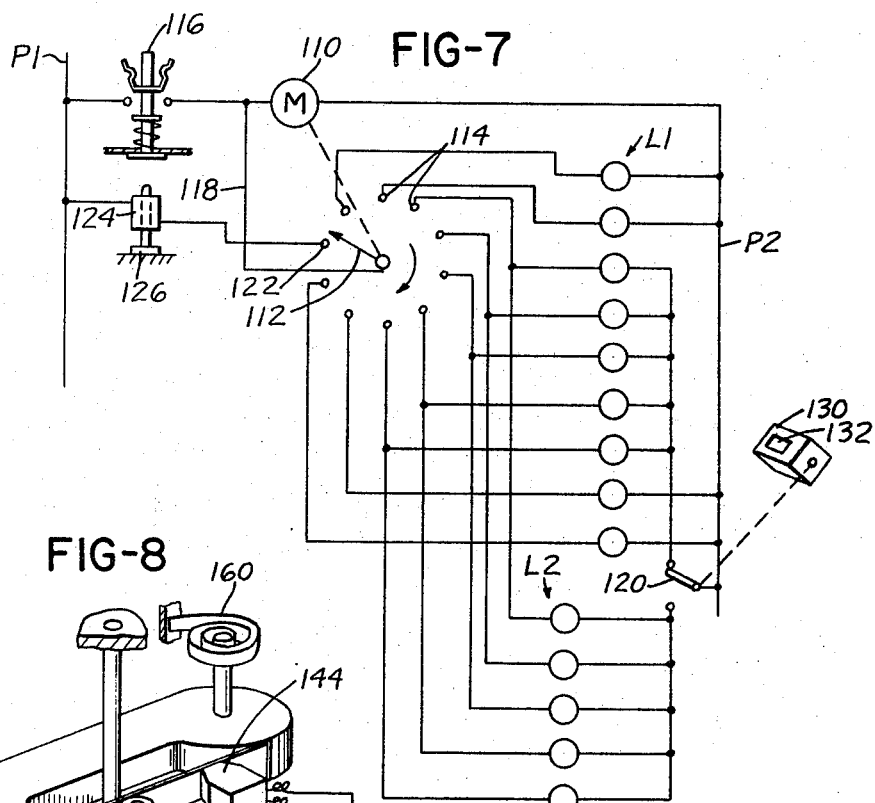
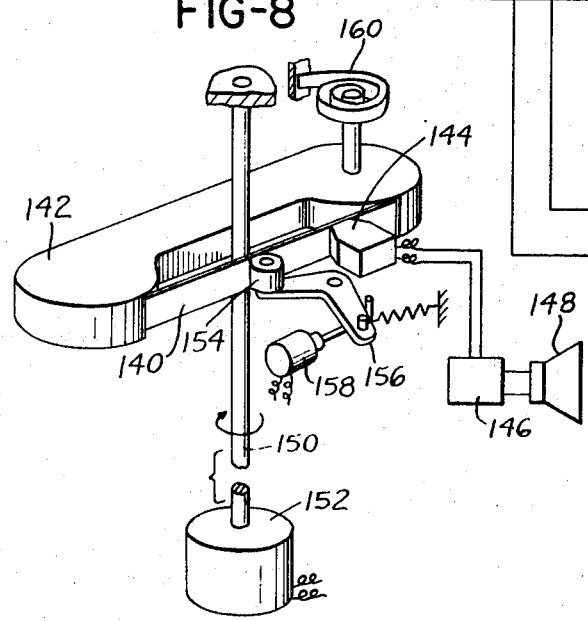
INVENTOR.
VICTOR J. PROLA

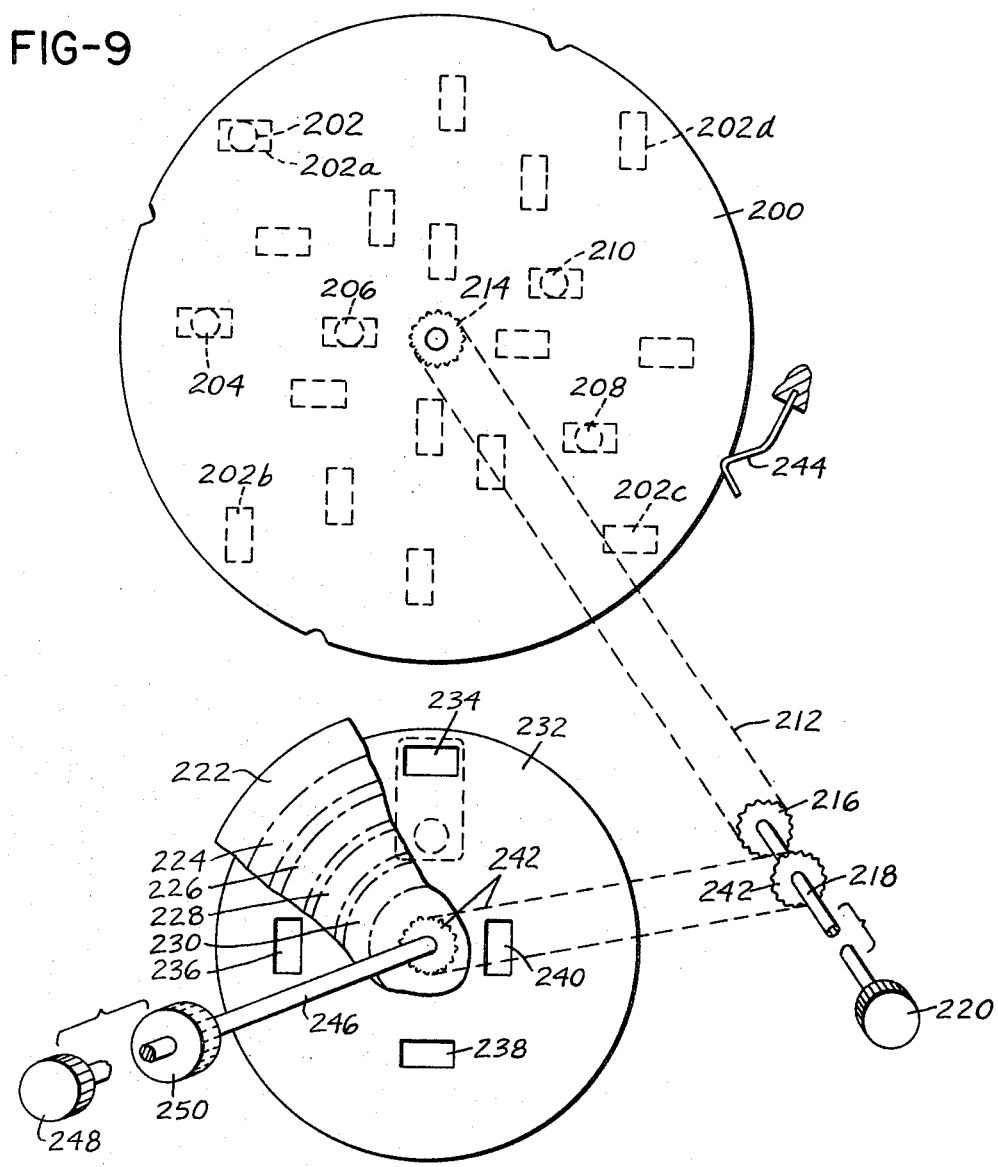
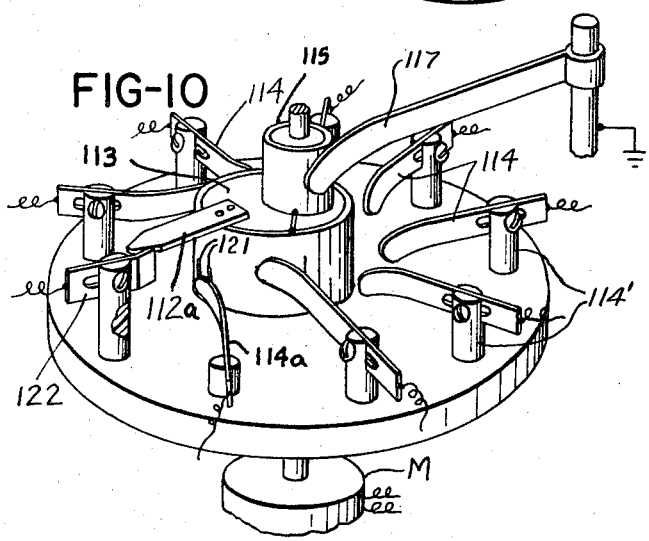

3,672,071

GAME DEVICE

This invention relates to a game device or teaching device, and in particular to a device of this nature involving mathematical or arithmetical operations and which embodies an air of mystification.

More particularly still, the present invention concerns a device in which certain selections, for example, of numbers, can be made and the device signals instructions to the operator or player which are to be followed and, subsequently, signals an answer which shows whether or not the signalled instructions have been properly followed.

A primary object of the present invention is the provision of a device of the nature referred to which is relatively compact and inexpensive, but quite efficient in operation and which, in addition to providing the pleasure of mystification and suspense, provides for practice in arithmetic.

Another object of this invention is the provision of a device of the nature referred to which is adjustable to provide for different types of instructions and different answers corresponding to the instructions.

A still further object is the provision of a device of the nature referred to which is both entertaining and educational and operates in a manner such as to mystify at least younger players.

These and other objects and advantages of the present invention will become more apparent upon reference to the following detailed description taken in connection with the accompanying drawings in which:

FIG. 1 is a somewhat schematic perspective view of one form which the present invention can take;

FIG. 2 is a perspective view showing a front panel of the device;

FIG. 3 is a perspective view showing a second panel located immediately behind the front panel;

FIG. 4 is a schematic perspective view showing the arrangement of lamps in the device, a switch connected to the lamps and one of the selectors forming a part of the structure;

FIG. 5 is a developed view of an indicator dial forming a part of the device;

FIG. 6 is a fragmentary view showing a portion of the answer disc of the device;

FIG. 7 is a schematic view showing a motor operated switch arrangement that can be employed with the device and also showing a modified form of selector arrangement for the device;

FIG. 8 is a schematic perspective view showing the manner in which the device could employ recordings so as to give audible signals;

FIG. 9 is a schematic representation of a modification; and

FIG. 10 shows a motor operated electric switch construction for use with the invention.

BRIEF SUMMARY OF THE INVENTION

The device of the present invention embodies the combination of instruction signalling means and answer indicating means with the instruction signalling means being sequentially actuated. The instruction signalling means may be visible or audible or a combination thereof and, in a preferred form which the invention takes, consist of instructions for performing mathematical or arithmetical operations.

The device embodies a selector for selecting an item of information, such as a number, which is employed during the carrying out of the instructions, together with another item of information, such as a number, which is indicated on the device.

Following the carrying out of the sequentially indicated instructions, the apparatus indicates an answer which will show whether or not the operator or player has correctly carried out the instructions indicated by the device.

The device is housed in a frame and may be either battery operated or operated from conventional household current and may include a manually operated switch for sequentially actuating the instruction signalling means or may embody a motor operative switch for that purpose.

DETAILED DESCRIPTION OF THE INVENTION

Referring to FIG. 1, the device indicated therein comprises a frame 10 having a wall opening at 12 in which is mounted panel means 14. In FIG. 1, panel means 14 is shown to be vertically disposed, but it will be understood that the panel means could be horizontally disposed as by being mounted in horizontal top wall 16 of the device. In this last mentioned case, the upstanding end part for the device would not be required.

FIG. 2 shows the outermost one of panel means 14, the panel in FIG. 2 being indicated by reference numeral 18. This panel means contains legends at 20 and 22 and, preferably, comprises a decorative picture at 24. The picture at 24 may include the representation of a crystal ball at 26 which is immediately above the region 28 where the answer is indicated at the end of a cycle of the machine.

Located behind panel 18 is a second panel 30 which has its edges disposed at vertical channels 32 so as to be moveable vertically in the frame of the device. A cam 34 engages the bottom of panel 30 and has two rotated positions, obtained by availing of knob 36 on the front of the machine, so that panel 30 can occupy a first lower position or a second upper position. In the lower position of panel 30 the legends indicated at 38, 40, 42, 44 and 46 are positioned at respective levels and when the panel is in an upper position, legends 48, 50, 52, 54 and 56 are positioned at the said levels.

Mounted in the frame of the device behind panel 30 is a support panel 58 having lamps 60, 62, 64, 66, 68, 70, 72, 74 and 75 fixedly mounted thereon. Lamps 60 and 62 are located at the level of legends 20 and 22 of panel 18 and, when energized, make the said legends visible and when de-energized, cause the legends 20 and 22 to be substantially invisible.

It will be apparent at this point that panels 18 and 30 are formed of light transmitting material, such as glass or plastic, and the legends are so formed thereon that, in the absence of illumination, the legends are substantially invisible. The picture 24 including the crystal ball 26 on panel 18 is, of course, visible at all times. Legends 20 and 22 might, for example, be formed or printed on the back of panel 18 which might be of a degree of translucency or of a color to prevent the legends from being visible except when illuminated.

The lamps 64, 66, 68, 70 and 72 are so located that when panel 30 is in its lower position they register with legends 38, 40, 42, 44 and 46 whereas when panel 30 is in its upper position the lamps register with legends 48, 50, 52, 54 and 56. Each of the aforementioned legends is invisible from the front of the machine, except when the lamps are illuminated, and it will be apparent that in each position of panel 30, illumination of the lamps will cause a different set of instructions to become visible.

Lamp 74 is in substantial alignment with the representation of a crystal ball at 26 on panel 18 and does not illuminate any of the legends on panel 30.

Toward the lower part of panel 58 is a further lamp 75 which is provided with a shield 75'. Lamp 75 is adapted for illuminating the marginal portion of an answer disc 76. The answer disc has an outer row of answers at 78 and an inner row of answers at 80. The outer row of answers pertain to the upper position of panel 30 and the inner row of answers, or both the inner and outer rows of answers, pertain to the lower position of panel 30. For making the answers on answer disc 76 selectively visible, panel 30 may have a window portion 82 formed therein which may be accomplished by covering the adjacent region of panel 30 with an opaque film such as paint or by cementing an apertured opaque member on panel 30. When panel 30 is in its lower position, aperture 82 will permit light from lamp 9 to pass through only the inner row 80 of answers on disc 76, or through both of the inner and outer rows of answers, and when panel 30 is in its upper position, lamp 9 will align with, and illuminate only the outer rows of answers on the disc.

Disc 76 is mounted on a shaft 84 extending to the front of the machine and having a knob 86 connected thereto so that shaft 84 can be rotated. Inside the front wall of the frame, shaft 84 carries a further disc or dial member 88 visible through a window 90 in horizontal top wall 16 of the frame. Knob 86 is availed of for selecting an item of information, such as a number, to be employed in carrying out the instructions printed on panel 30. Disc or dial 88 is, to this end, peripherally graduated with indicia visible through window 90.

As will be seen in FIG. 5, which is a developed view of the graduated peripheral portion of disc or dial 88, the peripheral graduations may comprise a series of numerals, from 1 to 29, for example.

The answer disc 76 is shown at FIG. 6 at enlarged scale and therein it will be seen that the outer row 78 of answers is in the form of numbers commencing with one-half and going up in steps of one-half to 14½. The second row 80 of answers on disc 76 is in the form of years and the answers are disposed under the respective numbers of row 78.

Disc 76 may be of translucent or transparent plastic material with the numbers formed thereon by printing or by applique techniques, or the disc may be opaque and have the numbers formed therein by punching so that light will pass through the numbers but not through the disc.

FIG. 4 shows a manual switch arrangement 90 which has contacts 92 connected to the lamps 60, 62, 64, 66, 68, 70, 72, 74 and 75. The switch embodies a rotatable contact arm 94 mounted on a shaft 96 which leads through the front wall of the device and is connected to a knob 98. As knob 98 is rotated, arm 94 sweeps over contacts 92 and thereby sequentially establishes circuits to the lamps referred to. Contact with the arm 94 can be made by a blade 100 connected through an on-off switch 102 with one terminal of a battery 104, the other terminal of which is connected by wire 106 with one side of each of the aforementioned lamps. The other side of the lamps are connected by respective wires leading to the contacts 92 and composed in a cable 108.

The switch 90 shown in FIG. 4 is manually operated and the source of electrical energy controlled by the switch could take the form of a battery or conventional household current.

In FIG. 7, there is shown an arrangement whereby a motor operated switch can be employed, and in this case, also either battery power or household current could be employed, but household current is to be preferred because of the power requirements. In FIG. 7, a slow speed motor is indicated at 110. This motor might be of the type employed in clock works, for example, and is geared down to provide for a slow speed of the output shaft and to which shaft is connected a switch arm 112 which sweeps over the contact elements 114 that lead to the lamps generally indicated at L1 and corresponding to the lamps mounted on panel 58.

In the arrangement of FIG. 7, one power line is indicated at P1 and the other power line is indicated at P2.

A switch 116, which is normally open, is adapted for being depressed to complete the circuit from line P1 through motor 110 to line P2. Closing of switch 116 also completes a connection through wire 118 to arm 112 of the switch. With motor 110 energized, arm 112 will sweep about the bank of contacts 114 and will sequentially engage the contacts and thereby sequentially illuminate the lamps L1, each of which has one side connected to a respective one of contacts 114 and the other side connected either directly to line P2, or through a selector switch 120 with line P2.

In order to halt motor 110 after it has completed one revolution, the switch has an additional contact 122 connected in circuit with a solenoid 124 having an armature 126. When solenoid 124 is energized armature 126 moves upwardly and actuates switch 116 into its open position, thereby interrupting the supply of current to motor 110 and to the arm 112 of the switch. Normally, the inertia of the motor 110 and of the moving switch parts will cause arm 112 to move on past contact 122 so that when switch 116 is next depressed, solenoid 124 will not become energized immediately but only after the switch arm has completed substantially one revolution.

FIG. 7 also shows a second bank of lamps indicated generally at L2 and which lamps will become sequentially illuminated when selector switch 120 is moved to its lower position. The lamps in bank L1 corresponding to lamps 60, 62, 74 and 75 have their sides opposite the switch connected directly to line P2 and are, thus, illuminated in either position of switch 120 but the lamps corresponding to lamps 64, 66, 68, 70 and 72 in FIG. 4, and which pertain to instructions, each has a second lamp adjacent thereto and this last mentioned group of lamps is under the control of switch 120. By the arrangement of FIG. 7, panel 30 does not shift vertically but, instead, there is a lamp behind each of the ten legends thereon with only five of the lamps being illuminated in each position of selector switch 120.

Further, the aperture 82 in panel 30 in FIGS. 3 and 4 is replaced by a light shield member 130 in FIG. 7 having an aperture 132 which registers with the outer row of answers on disc 76 in one position of the switch and with the other row of answers, or with both rows of answers, on disc 76 in the other position of the switch. Shield member 130 is connected to the movable arm of the selector switch 120 so as to be controlled thereby.

In the above described modifications, all instructions are conveyed by the legends carried by panel 30, but it is possible within the purview of the present invention to convey instructions audibly either with or without the illuminated visible instructions. Such a modification is fragmentarily illustrated in FIG. 8, wherein a recording element such as tape 140 is carried in a cartridge arrangement 142. Tape 140 can be, for example, a magnetic tape and provide for audible sounds when moved past a pick up head 144 which supplies the signals received thereby through an amplifier 146 to a speaker 148. Other types of record members having different types of reading heads could also be supplied.

A capstan 150 driven by motor 152 is provided adjacent tape 140 and is normally ineffective for driving tape 140. A pressure roller 154 is mounted on a lever 156 in opposed relation to the capstan and is pressed toward the capstan by energization of a solenoid 158. When solenoid 158 is energized, capstan 150 will drive tape 140 and the instructions recorded on the tape will sound audibly through speaker 148. At the end of a cycle of the device, solenoid 158 is deenergized thereby releasing pressure roller 158 from driving position and permitting a rewind spring 160 to return the tape to its starting position.

The capstan 150 has been indicated in FIG. 8 as elongated and the reason for this is that a plurality of the cartridges 142 will be arranged in superimposed relation so that selective operation of the record members carried thereby could be effected depending on which of the pertaining solenoids was energized. Normally, the spring 160 would be embodied directly within the cartridge so that each cartridge and the components pertaining thereto would be relatively small physically so that the cartridges could be grouped together relatively closely.

As mentioned, the instructions contained in the cartridges could form the sole means for signalling the instructions, or the cartridges could operate in combination with illuminated instructions.

One cartridge could contain the entire series of instructions for a game and thus, would be driven throughout the cycle of the device. A selector switch would, in that case, select the cartridge to be effective and would be actuated by the game selector knob.

FIG. 9 shows a modification wherein an instruction disc 200 is provided behind which is arranged five lamps 202, 204, 206, 208 and 210. Each lamp is adapted for illuminating a single instruction and the lamps are distributed radially and circumferentially with respect to disc 200. Pertaining to lamp 202 are the legend regions 202a, 202b, 202c and 202d. These legend areas are spaced apart 90° and in each of four rotated portions of disc 200, one of the said legend areas registers with lamp 202.

Each of the other lamps 204, 206, 208 and 210, similarly have four legend areas spaced at 90° intervals about disc 200 with one thereof registering with the respective lamp in each rotated position of the disc. The disc may be driven, as by a chain 212 entrained over sprocket 214 on disc 200 and sprocket 216 on shaft 218 which leads to a game selector knob 220 at the front of the device.

Since disc 200 provides for four sets of instructions, the answer disc 222 pertaining thereto has four rows of answers as shown at 224, 226, 228 and 230. To permit the rows of answers to be selectively visible there is provided a further disc 232 having window 234 registering with row 224 of answers, window 236 registering with row 226 of the answers, window 238 registering with row 228 of the answers, and window 240 registering with row 230 of the answers. Disc 232 is likewise connected with shaft 218 as by the chain and sprocket means 242 and has a respective rotated position for each rotated position of disc 200.

Detent means as at 244 can be provided for precisely locating discs 200 and 232 in each of four operative positions thereof if so desired.

The answer disc 222, as before, is mounted on a shaft 246 leading through the front wall of the machine to a selector knob 248. Also mounted on shaft 246 is graduated disc 250 which has indicia arranged thereon in the same manner as dial or disc 88 shown in FIGS. 4 and 5.

In operation, making reference to the modification of FIGS. 1 to 6, let it be assumed that the panel 30 is adjusted to its upper position so that the outer row of answers on answer disc 76 will be lined up with aperture 82 while lamps 64, 66, 68, 70 and 72 will be aligned with the lower set of instructions on panel 30.

If the device is now turned on by closing switch 102, and with switch arm in its FIG. 4 position, lamp 60 will be illuminated and this will cause legend 20 on panel 18 to become visible. This legend might take any fanciful form for example, "I AM A SWAMI". When the switch arm is then indexed to the next contact 92 in a clockwise direction lamp 62 will be energized and will illuminate legend 22 which, again may be a fanciful legend such as "I WILL READ YOUR MIND". Alternatively, both of lamps 60 and 62 may be illuminated at the same time. The legends 20 and 22 may be sequentially actuated, as described, or the lamps pertaining thereto may be energized as long as switch 102 is closed merely by wiring around the contacts of switch 90 pertaining thereto.

The third clockwise position of switch arm 94 will energize lamp 64 thereby illuminating legend 48 which is the first of the instructions to be followed and which instruction might take the form for example, of "THINK A NUMBER" or "TAKE A NUMBER". The switch arm 94 is then indexed to the next contact which is connected to lamp 70 so that the instruction 50 becomes illuminated and the instruction might take the form of "MULTIPLY BY 2", or "DOUBLE IT".

The next indexed position of switch arm 94 will energize lamp 66 and illuminate instruction 52 which takes the form of "SELECT A NUMBER AND ADD". This instruction relates to rotation of knob 86 until desired number on dial 88 is visible through window 90. This number is then added to the result obtained from instruction 50.

The next indexed position of switch arm 94 will energize lamp 72 and illuminate instruction 56 which takes the form of "DIVIDE BY 2". The switch is then indexed again and in this position will energize lamp 68 to illuminate instruction 54. This instruction takes the form of "SUBTRACT THE ORIGINAL NUMBER" which is the final instructions.

The next indexed position of switch arm 94 will energize lamp 74 and cause the crystal ball at 26 to glow and, thereafter, switch arm 94 is indexed to its last position and energizes lamp 75 so that the answer disc is illuminated and an answer will show at the bottom of panel 18 at 28. This answer, of course, is determined when knob 86 is adjusted to select the second number and if the mathematical operations referred to above have been carried out without error, the number indicated as the answer will be one-half the number selected on dial 88.

If panel 30 is adjusted to its lower position, a different set of instructions are carried out and different answers are given, as will be explained hereinafter.

In the modification of FIG. 7, the same situation exists except the switch arm rotates automatically rather than being manually actuated and the entire machine shuts off at the end of the cycle.

It will be apparent that the motor operated switch of FIG. 7 could be designed with the contacts spaced at different intervals to obtain desired time periods during which to carry out the instructions.

FIG. 10 shows a preferred type of motor operated switch, such as would be used in the modification of FIG. 7. In FIG. 10, motor M drives a shaft 111 which carries eccentric rotor 113 and concentric rotor 115. A lead in brush 117 rests on the conductive periphery of rotor 115 and which is electrically joined to the conductive periphery of rotor 113.

Brushes 114 engage the periphery of rotor 113 and are successively engaged thereby as the rotor turns. The dwell of each brush 114 on the periphery of rotor 113 is adjustable by radially adjusting the brushes on the insulating support posts 114' provided therefor. Slots 119 in the brushes permit the adjustment referred to. By proper adjustment of brushes 114, the dwell of each on rotor 113 can be regulated to provide for the desired period of illumination of the corresponding lamp and any desired overlap of the period of illumination of successively illuminated lamps.

Brush 114a, which may pertain to the answer lamp, rides on an axial portion of the conductive periphery of rotor 113 on which strips, or ribs, of insulation 121 are applied so the lamp will blink on and off as the rotor turns.

Brush 122, connected to the turn-off solenoid 124 of FIG. 7, is arranged to be engaged by the end of an arm 112a so that as the rotor turns, the solenoid will be energized to open the main switch 116 with the rotor coasting on to carry arm 112a past brush 122.

The switch described is quite inexpensive, but is reliable and easy to adjust.

In the modification of FIG. 8, the same cycle of operations obtains except that for each selected game a different tape is operated and gives audible instructions in substantially timed relation to the visible instructions where the latter are employed. Since the record tapes run at a certain speed, where visible instructions are employed in connection with the audible instructions, it is preferably to use the motor operated switch of FIG. 7 for controlling the illumination of the visible instructions.

The modification of FIG. 8 operates in the same manner as described, the only difference being that more games, or sets of instructions, can be selected.

The modification of FIG. 9 offers the advantage of a simple form which the game could take by providing a series of answers on disc 200 and eliminating the answer disc and the selection of the additional number or piece of information which influences the answer. In the case of the simplified modification, there would be only one disc with a series of instruction illuminating lamps and an answer illuminating lamp located behind the disc so that in each position of the disc a certain series of instructions would be sequentially indicated and a certain answer resulting from carrying out the instruction would be indicated toward the end of the cycle.

Following are some specific game examples which can be played with the modification of FIGS. 1 to 4, with or without the motor operated switch.

In a first example, the answer disc has two rows of numbers which are the same. The instructions for the first example are:

| 1. | Take a number | for example 5. |
| --- | --- | --- |
| 2. | Multiply by 2 or, double it | result, 10. |
| 3. | Select and add a number twice the number taken | 10 + 10 = 20. |
| 4. | Divide by 2 | result, 10. |
| 5. | Subtract number taken | result, 5. |

The answer disc when illuminated will show: 5, with the upper number being the one first taken and the other being the answer to the problem.

In a second example, the answer disc shows only a single row of answers. The instructions for the second example are:

| 1. | Think, or take, a number | for example, 20. |
| --- | --- | --- |
| 2. | Double it | result, 40. |
| 3. | Select a number and add | select 10 and add 40 = 50. |
| 4. | Divide by 2 | result 25. |
| 5. | Subtract original number | answer shown on disc is 5. |

In a third example, the answer disc shows two rows of numbers. The instructions for the third example are:

| 1. | Think a number | 5. |
| --- | --- | --- |
| 2. | Double it | 10. |
| 3. | Select a number twice the original and add | 10 + 10 = 20. |
| 4. | Subtract original number | 20 − 5 = 15. |

The answer disc, when illuminated, will then show: 15, with the upper member being the original number and the lower number being the answer to the problem.

In a fourth example, the answer disc has an outer row of numbers and an inner row of dates. The instructions for the fourth example are:

| 1. | Take your age | 20, for example. |
| --- | --- | --- |
| 2. | Double it | 20 × 2 = 40. |
| 3. | Select a number twice the age and add | 40 + 40 = 80. |
| 4. | Divide by 2 | 80 divided by 2=40. |
| 5. | Subtract original number | 40 − 20 = 20. |

The answer disc, when illuminated, will show: 1949, with the 20 being the players age and the 1949 giving the birth year.

In a fifth example, two selector discs and two answer discs are provided. The instructions for the fifth example are:

| 1. | Select your age on selector disc A | 10, for example. |
| --- | --- | --- |
| 2. | Double it | 10 × 2 = 20. |
| 3. | Add 5 | 20 + 5 = 25. |
| 4. | Multiply by 50 | 25 × 50 = 1250. |
| 5. | Subtract 365 | 1250 − 365 = 885. |
| 6. | Select a number (less than 100) on selector disc B and add, for example | 885 + 50 = 935. |
| 7. | Add 115 | 935 + 115 = 1050. |

The answer disc, when illuminated, will show the answer, 1050, of which the first two numbers represent the age and the last two, the selected number. In this modification, the answer discs may be side by side so the two, taken together, show a single answer.

The possibility of modification of the device is substantially without limit. For example, while a series of only five instructions have been used in the examples, the series of instructions and the number of sets of instructions could be increased substantially without limit. Further, in the examples given instructions for only simple arithmetical operations have been employed, but more complex and sophisticated mathematical operations could be utilized for more advanced students. Thus, the device can take the form of a relatively simple game for younger players and become more complex and sophisticated and serve as a teaching or instruction device for more advanced players.

MOdifications can be made within the scope of the appended claims.

What is claimed is:

1. In a game or teaching device: a frame, a plurality of instruction signalling means in said frame, said instructions utilizing an item of information, means for sequentially actuating said instruction signalling means in a predetermined order, answer signalling means in said frame operable when actuated for indicating the answer which results when the signalled instructions have been followed correctly, means for actuating said answer signalling means after the final one of said instruction signalling means has been actuated, manually operable selector means adjustable into a plurality of positions each corresponding to a predetermined different said item of information which is to be utilized in following said instructions, means connected to said selector means for indicating the said item of information pertaining to the respective adjusted position of said selector means, said answer signalling means being adjustable to provide for a respective answer which results from utilizing the selected said item of information in following said instructions, and means operated by said selector means for adjusting said answer signalling means into a respective position for each adjusted position of said selector means to cause the answer signalling means when actuated to indicate the answer corresponding to the selected item of information.

2. A device according to claim 1, in which said instruction signalling means comprises at least two sets of instruction signalling elements each forming a complete set of instructions, and a further selector operable for selectively making either one of said sets of instruction signalling elements effective while making the other thereof ineffective.

3. A device according to claim 1, in which said instruction signalling means comprise panel means through which light will pass and legends embodying said instructions printed on the panel means in spaced relation to each other, said frame having walls, one of said walls having an opening therein, said panel means being mounted in said wall opening of said frame, means normally preventing said legends from being seen, a light source stationarily mounted in said frame behind the panel means for each instruction to be given and located in the region of the respective legend and operable when energized to cause the respective legend to become visible from the side of said panel means which faces away from said frame, and a switch connected to said light sources and operable for sequentially energizing said light sources.

4. A device according to claim 3, in which said instruction signalling means comprises at least two sets of instruction signalling elements, the elements of each set being equal in number and being distributed on said panel means in one and the same pattern with the pattern of one set being displaced from the pattern of the other said set in a predetermined direction, and means for causing the legends of only one of said sets at a time to become sequentially visible.

5. A device according to claim 4, in which said light sources are equal in number to the number of elements in each set and are distributed in the same pattern as the elements of each set, said other selector comprising means operable for shifting said panel means in said frame in the direction of displacement of said sets of instructions from each other to bring selected sets of said elements into registration with said light sources.

6. A device according to claim 4, in which said light sources comprise a group of light sources for each set of elements with a light source in position to illuminate each said element, said other selector comprising means for connecting said switch to the group of light sources pertaining to a selected set of elements.

7. A device according to claim 3, in which said answer signalling means has answer legends in distributed relation thereon and indicates answers visibly when illuminated, and a lamp operable when energized for illuminating the region of said answer signalling means bearing the selected answer.

8. A device according to claim 7, in which said answer signalling means is in the form of a disc adjacent said wall opening and having the said answers in the form of punch-outs near the periphery of the disc, said lamp being located in said frame behind said disc, and means shielding said lamp and the region of the disc to be illuminated thereby.

9. A device according to claim 7, in which said switch is manually operable.

10. A device according to claim 7, in which said switch is a rotary switch and in one revolution sequentially energizes said light sources, a motor driving said switch, a momentary start switch for initiating operation of said motor, and means responsive to one complete rotation of said motor following energization thereof for interrupting the supply of energy to the motor.

11. A device according to claim 7, in which said panel means is mounted in said wall opening of said frame behind a light transmitting second panel, further legends on said second panel and further light sources in said frame behind said further legends and energizable for making said further legends visible.

12. A device according to claim 1, in which said instructions are in the form of mathematical operations, and said items of information and said answers are in the form of numbers.

13. A device according to claim 1, in which at least said instruction signalling means include audible means.

14. A device according to claim 13, in which said audible means comprise recorded sound tracks and transducer means actuated by the sound tracks and operable to produce sound.

* * * * *